(12) United States Patent
Rooney, III et al.

(10) Patent No.: US 9,254,898 B2
(45) Date of Patent: Feb. 9, 2016

(54) HULL ROBOT WITH ROTATABLE TURRET

(75) Inventors: James H. Rooney, III, Harvard, MA (US); Timothy I. Mann, Gilbertville, MA (US); Howard R. Kornstein, Lexington, MA (US); Joel N. Harris, Westborough, MA (US); Jonathan T. Longley, Andover, MA (US); Scott H. Allen, Jamaica Plain, MA (US)

(73) Assignee: Raytheon Company, Waltham, MA (US)

( * ) Notice: Subject to any disclaimer, the term of this patent is extended or adjusted under 35 U.S.C. 154(b) by 981 days.

(21) Appl. No.: 12/583,346

(22) Filed: Aug. 19, 2009

(65) Prior Publication Data

US 2010/0131098 A1    May 27, 2010

Related U.S. Application Data

(63) Continuation-in-part of application No. 12/313,643, filed on Nov. 21, 2008.

(51) Int. Cl.
*B63B 59/08* (2006.01)
*B63B 59/10* (2006.01)
*G05D 1/02* (2006.01)

(52) U.S. Cl.
CPC .............. *B63B 59/10* (2013.01); *G05D 1/0219* (2013.01); *G05D 1/0227* (2013.01); *G05D 1/0274* (2013.01); *G05D 1/0276* (2013.01); *G05D 2201/0203* (2013.01)

(58) Field of Classification Search
CPC ...... B62D 57/00; B62D 55/265; E21B 41/04; B62C 11/42; B63B 59/10; B63B 59/08; B63B 59/06; G05D 1/027; G05D 1/0276; G05D 1/0274; G05D 1/0272; G05D 1/0219; G05D 1/0227; H01F 7/04; Y02T 70/32
USPC ....... 114/222; 166/250.01; 180/9.1; 700/245, 700/248, 258, 259
See application file for complete search history.

(56) References Cited

U.S. PATENT DOCUMENTS

| | | | |
|---|---|---|---|
| 2,104,062 | A | 1/1938 | Temple |
| 2,132,661 | A | 10/1938 | Temple |
| 2,386,650 | A | 10/1945 | Bell |
| 3,058,783 | A | 10/1962 | Wadsworth et al. |

(Continued)

FOREIGN PATENT DOCUMENTS

| CN | 2405719 | 11/2000 |
|---|---|---|
| CN | 2552648 | 5/2003 |

(Continued)

OTHER PUBLICATIONS

U.S. Appl. No. 12/586,248, filed Sep. 18, 2009; James H. Rooney III; office action mailed Dec. 13, 2011.

(Continued)

*Primary Examiner* — Stephen Holwerda

(57) ABSTRACT

A hull robot includes a turbine subsystem actuatable by fluid moving past the hull, a drive subsystem for maneuvering the robot about the hull, and an adjustment subsystem for either the turbine subsystem or the drive subsystem. A controller is configured to operate the adjustment subsystem to adjust the position of the turret subsystem relative to the drive subsystem until fluid flowing past the hull results in an optimal flow of fluid with respect to the turbine subsystem.

25 Claims, 13 Drawing Sheets

(56) References Cited

U.S. PATENT DOCUMENTS

| | | | |
|---|---|---|---|
| 3,088,429 A | 5/1963 | Johannessen | |
| 3,285,676 A | 11/1966 | Hetteen | |
| 3,439,937 A | 4/1969 | Dixon | |
| 3,554,300 A | 1/1971 | Rosenberg | |
| 3,638,600 A | 2/1972 | Modrey | |
| 3,682,265 A | 8/1972 | Hiraoka et al. | |
| 3,750,129 A | 7/1973 | Takeno et al. | |
| 3,777,834 A | 12/1973 | Hiraoka et al. | |
| 3,906,572 A | 9/1975 | Winn | |
| 3,922,991 A | 12/1975 | Woods | |
| 3,934,664 A | 1/1976 | Pohjola | |
| 3,946,692 A | 3/1976 | Sierra et al. | |
| 3,960,229 A | 6/1976 | Shio | |
| 3,984,944 A | 10/1976 | Maasberg et al. | |
| 4,046,429 A | 9/1977 | Pohjola | |
| 4,079,694 A | 3/1978 | Galinou | |
| 4,119,356 A | 10/1978 | Pohjola | |
| 4,135,492 A | 1/1979 | Heitland | |
| 4,202,453 A | 5/1980 | Wilkes | |
| 4,251,791 A | 2/1981 | Yanagisawa et al. | |
| 4,401,048 A | 8/1983 | Rogers | |
| 4,444,146 A | 4/1984 | DeWitz et al. | |
| 4,574,722 A | 3/1986 | Orita et al. | |
| 4,674,949 A | 6/1987 | Kroczynski | |
| 4,690,092 A | 9/1987 | Rabuse | |
| 4,697,536 A | 10/1987 | Hirata | |
| 4,697,537 A | 10/1987 | Smith | |
| 4,734,954 A | 4/1988 | Greskovics et al. | |
| 4,736,826 A | 4/1988 | White et al. | |
| 4,788,498 A | 11/1988 | Uemura | |
| 4,789,037 A | 12/1988 | Kneebone | |
| 4,809,383 A | 3/1989 | Urakami | |
| 4,841,894 A | 6/1989 | Nellessen, Jr. | |
| 4,890,567 A | 1/1990 | Caduff | |
| 4,926,775 A | 5/1990 | Andorsen | |
| 5,048,445 A | 9/1991 | Lever et al. | |
| 5,174,222 A | 12/1992 | Rogers | |
| 5,203,646 A * | 4/1993 | Landsberger | B08B 9/049 104/138.2 |
| 5,249,631 A | 10/1993 | Ferren | |
| 5,253,605 A | 10/1993 | Collins | |
| 5,253,724 A | 10/1993 | Prior | |
| 5,285,601 A | 2/1994 | Watkin et al. | |
| 5,337,434 A | 8/1994 | Erlich | |
| 5,366,038 A | 11/1994 | Hidetsugu et al. | |
| 5,378,994 A | 1/1995 | Novak et al. | |
| 5,435,405 A | 7/1995 | Schempf et al. | |
| 5,569,371 A * | 10/1996 | Perling | E04H 4/1654 15/1.7 |
| 5,628,271 A | 5/1997 | McGuire | |
| 5,831,432 A | 11/1998 | Mohri | |
| 5,849,099 A | 12/1998 | McGuire | |
| 5,852,984 A | 12/1998 | Matsuyama et al. | |
| 5,884,642 A | 3/1999 | Broadbent | |
| 5,894,901 A | 4/1999 | Awamura et al. | |
| 5,947,051 A * | 9/1999 | Geiger | B62D 57/00 114/222 |
| 6,000,484 A | 12/1999 | Zoretich et al. | |
| 6,053,267 A | 4/2000 | Fisher | |
| 6,064,708 A | 5/2000 | Sakamaki | |
| 6,102,145 A | 8/2000 | Fisher | |
| 6,125,955 A | 10/2000 | Zoretich et al. | |
| 6,209,473 B1 | 4/2001 | Jones et al. | |
| 6,276,478 B1 * | 8/2001 | Hopkins | B62D 57/024 114/222 |
| 6,317,387 B1 | 11/2001 | D'Amaddio et al. | |
| 6,564,815 B2 | 5/2003 | McGuire | |
| 6,595,152 B2 | 7/2003 | McGuire | |
| 6,698,375 B2 | 3/2004 | Delfosse | |
| 6,698,376 B2 | 3/2004 | Delahousse et al. | |
| 6,792,335 B2 | 9/2004 | Ross et al. | |
| 6,886,486 B2 | 5/2005 | Van Rompay | |
| 6,886,651 B1 | 5/2005 | Slocum et al. | |
| 6,974,356 B2 | 12/2005 | Hobson | |
| 7,286,214 B2 | 10/2007 | Reinersman et al. | |
| 7,290,496 B2 | 11/2007 | Asfar et al. | |
| 7,296,530 B1 | 11/2007 | Bernstein et al. | |
| 7,390,560 B2 | 6/2008 | Wallach | |
| 7,496,226 B2 | 2/2009 | Negahdaripour et al. | |
| 7,520,356 B2 | 4/2009 | Sadegh et al. | |
| 7,866,421 B2 | 1/2011 | Moore et al. | |
| 7,934,575 B2 | 5/2011 | Waibel et al. | |
| 8,109,383 B1 | 2/2012 | Suderman et al. | |
| 8,214,081 B2 | 7/2012 | Choi et al. | |
| 8,342,281 B2 | 1/2013 | Rooney, III | |
| 8,386,112 B2 | 2/2013 | Rooney, III | |
| 8,393,286 B2 | 3/2013 | Rooney, III et al. | |
| 8,393,421 B2 | 3/2013 | Kornstein et al. | |
| 8,723,536 B2 | 5/2014 | Miyazaki et al. | |
| 8,985,250 B1 | 3/2015 | Lussier et al. | |
| 2003/0000445 A1 | 1/2003 | McGuire | |
| 2004/0089216 A1 | 5/2004 | Van Rompay | |
| 2004/0133999 A1 | 7/2004 | Walton | |
| 2004/0250934 A1 | 12/2004 | Hamdan | |
| 2005/0027412 A1 | 2/2005 | Hobson et al. | |
| 2005/0156562 A1 | 7/2005 | Cohen et al. | |
| 2005/0199171 A1 | 9/2005 | Ecklund | |
| 2005/0216125 A1 | 9/2005 | Huston et al. | |
| 2006/0175439 A1 | 8/2006 | Steur et al. | |
| 2006/0191457 A1 | 8/2006 | Murphy | |
| 2006/0249622 A1 | 11/2006 | Steele | |
| 2006/0261772 A1 | 11/2006 | Kim | |
| 2007/0089916 A1 | 4/2007 | Lundstrom | |
| 2007/0276552 A1 | 11/2007 | Rodocker et al. | |
| 2007/0284940 A1 | 12/2007 | Koolhiran | |
| 2008/0009984 A1 | 1/2008 | Lee et al. | |
| 2008/0202405 A1 | 8/2008 | Kern | |
| 2008/0276407 A1 | 11/2008 | Schnittman et al. | |
| 2008/0281470 A1 | 11/2008 | Gilbert, Jr. et al. | |
| 2008/0300821 A1 | 12/2008 | Frank et al. | |
| 2008/0308324 A1 | 12/2008 | Moser et al. | |
| 2009/0078484 A1 | 3/2009 | Kocijan | |
| 2009/0094765 A1 | 4/2009 | Osaka et al. | |
| 2009/0166102 A1 | 7/2009 | Waibel et al. | |
| 2009/0301203 A1 | 12/2009 | Brussieux | |
| 2010/0000723 A1 | 1/2010 | Chambers | |
| 2010/0126403 A1 | 5/2010 | Rooney, III et al. | |
| 2010/0131098 A1 | 5/2010 | Rooney, III et al. | |
| 2010/0217436 A1 | 8/2010 | Jones et al. | |
| 2010/0219003 A1 | 9/2010 | Rooney, III et al. | |
| 2010/0238050 A1 | 9/2010 | Rhodes et al. | |
| 2011/0050374 A1 | 3/2011 | Dvorak | |
| 2011/0067615 A1 | 3/2011 | Rooney, III et al. | |
| 2011/0083599 A1 | 4/2011 | Kornstein et al. | |
| 2012/0006352 A1 | 1/2012 | Holappa et al. | |
| 2012/0215348 A1 | 8/2012 | Skrinde | |
| 2014/0076223 A1 | 3/2014 | Smith | |
| 2014/0076224 A1 | 3/2014 | Smith | |
| 2014/0076225 A1 | 3/2014 | Smith | |
| 2014/0076226 A1 | 3/2014 | Smith | |
| 2014/0077587 A1 | 3/2014 | Smith | |
| 2014/0081504 A1 | 3/2014 | Smith | |

FOREIGN PATENT DOCUMENTS

| | | |
|---|---|---|
| CN | 1864944 A | 11/2006 |
| CN | 101387687 A | 3/2009 |
| DE | 3611750 | 10/1987 |
| EP | 1785552 A2 | 5/2007 |
| FR | 1352056 A | 2/1964 |
| FR | 2948920 A1 | 2/2011 |
| FR | 2861457 A1 | 8/2012 |
| GB | 2038721 A | 7/1980 |
| GB | 2103162 | 2/1983 |
| GB | 2165330 A | 4/1986 |
| JP | S48-014096 | 2/1973 |
| JP | S49-001434 | 1/1974 |
| JP | S5012797 | 2/1975 |
| JP | S50-81487 U | 7/1975 |
| JP | 58-012075 | 1/1983 |
| JP | S58-14096 | 1/1983 |
| JP | S60-13117 | 7/1985 |
| JP | S60-131174 A | 7/1985 |
| JP | S62-130999 | 8/1987 |

(56) References Cited

FOREIGN PATENT DOCUMENTS

| JP | 04-002592 | 1/1992 |
|---|---|---|
| JP | H05-19086 | 1/1993 |
| JP | 06-099888 | 4/1994 |
| JP | 08-310384 | 11/1996 |
| JP | H10-16884 | 1/1998 |
| JP | 2003025265 | 1/2003 |
| JP | 2005-335882 | 12/2005 |
| WO | WO 99/74489 A1 | 2/1999 |
| WO | WO 02/074611 A2 | 9/2002 |
| WO | WO 02/074611 A3 | 9/2002 |
| WO | WO 03/087501 A1 | 10/2003 |
| WO | WO 2005/014387 A1 | 2/2005 |
| WO | WO 2007/137234 A2 | 11/2007 |
| WO | WO 2010/134022 A1 | 11/2010 |
| WO | WO 2011015786 A1 | 2/2011 |
| WO | WO 2011/146103 | 11/2011 |
| WO | WO 2012/104109 A1 | 8/2012 |

OTHER PUBLICATIONS

Written Opinion of the International Searching Authority, International Application No. PCT/US2010/002693, Dec. 9, 2010, 8 pgs. (unnumbered).
U.S. Appl. No. 12/800,174, filed May 10, 2010; James H. Rooney, III; office action issued Feb. 24, 2012.
U.S. Appl. No. 12/586,248, filed Sep. 18, 2009, Rooney et al.
U.S. Appl. No. 12/587,949, filed Oct. 14, 2009, Komstein et al.
Written Opinion of the International Searching Authority for PCT Application No. PCT/US2009/006122 mailed Feb. 3, 2010 (seven (7) pages).
Borchardt, John, Grooming the Fleet, Mechanical Engineering, vol. 132/No. 4 Apr. 2010, pp. 33-35.
U.S. Appl. No. 12/313,643, filed Nov. 21, 2008; James H. Rooney III; office action issued Apr. 13, 2012.
U.S. Appl. No. 12/586,248, filed Sep. 18, 2009; James H. Rooney III; office action issued May 24, 2012.
U.S. Appl. No. 12/587,949, filed Oct. 14, 2009; Howard R. Kornstein; office action issued May 25, 2012.
Townsin, R.L., The Ship Hull Fouling Penalty, Biofouling, Jan. 2003, vol. 19, (supplement), Jan. 1, 2003, pp. 9-15.
Rosenhahn et al., Advanced Nanostructures for the Control of Biofouling: The FP 6 EU Integrated Project AMBIO, Biointerphases 3(1) Mar. 2008, published Feb. 21, 2008; pp. IR1-IR5.
Preiser et al., Energy (Fuel) Conservation Through Underwater Removal and Control of Fouling on Hulls of Navy Ships, Naval Research and Development Center, Materials Department, Annapolis, Research and Development Report, Dec. 1975, 52 pgs.
Man, B&W, Basic Principles of Ship Propulsion, Basics of Ship Propulsion, pp. 1-30, Apr. 2004.
A Copenhagen Climate Treaty, Version 1.0 Draft, A Proposal for a Copenhagen Agreement by Members of the NGO Community, published Jun. 2009, pp. 1-78 (80 pages total).
Yuan, et al., The Design of Underwater Hull-Cleaning Robot, Journal of Marine Science and Application, vol. 3, No. 1, Jun. 2004, pp. 41-45.
Tallett, et al., Potential Marine Fuels Regulations: Impacts on Global Refining, Costs & Emissions, Joint IFQC & IPIECA Roundtable: Impacts of CO2 Emissions from Refining & Shipping, London, England Oct. 1, 2007, 17 pgs.
RTI International, EnSys Energy & Systems, Inc., Navigistics Consulting; Global Trade and Fuels Assessment—Future Trends and Effects of Designating Requiring Clean Fuels in the Marine Sector: Task Order No. 1, Draft Report, RTI Project No. 0209701.001, Apr. 2006 (82 pages total).
Anti-Fouling Systems, Focus on IMO, International Maritime Organization, UK, 2002, pp. 1-31. http://www.uscg.mil/hq/cg5/cg522/cg5224/docs/FOULING2003.pdf.
Fernandez, Linda, NAFTA and Member Country Strategies for Maritime Trade and Marine Invasive Species, Journal of Environmental Management 89, 2008, pp. 308-321.

Munk, Torben, Fuel Conservation Through Managing Hull Resistance, Motorship Propulsion Conference, Copenhagen, Apr. 26, 2006 pp. 1-10.
Kohli, Nikita, Biofouling and Design of a Biomimetic Hull-Grooming Tool, Naval Surface Warfare Center Carderock Division, West Bethesda, MD, NSWCCD-CISD-2007/002, Ship Systems Integration & Design Department Technical Report, Sep. 2007, 38 pages total.
Written Opinion of the International Searching Authority, International Application No. PCT/US2011/000787, Jul. 20, 2011, 7 pgs. (unnumbered).
Written Opinion of the International Searching Authority, International Application No. PCT/US2011/000770, Aug. 9, 2011, 5 pgs. (unnumbered).
U.S. Appl. No. 12/800,486, filed May 17, 2010, James H. Rooney, III.
Written Opinion of the International Searching Authority, International Application No. PCT/US2010/002163, Oct. 13, 2010, 5 pgs. (unnumbered).
Written Opinion of the International Searching Authority, International Application No. PCT/US2010/002164, Oct. 8, 2010, 5 pgs. (unnumbered).
U.S. Appl. No. 12/313,643, filed Nov. 21, 2008, Rooney et al.
Lee Min Wai Serene and Koh Cheok Wei, "Design of a Remotely Operated Vehicle (ROV) for Underwater Ship Hull Cleaning", National University of Singapore, 2003, pp. 1-6.
Fu-Cai et al., "The Design of Underwater Hull-Cleaning Robot", *Journal of Marine Science and Application*, vol. 3, No. 1, Jun. 2004, pp. 41-45.
Hismar *Hull Identification System for Maritime Autonomous Robots*, htt;://hismar.ncl.ac.uk/public_docs/HISMAR_Poster.pdf (1 Page).
Hismar Hismar News Report No. 2 2008, http://hismar.ncl.ac.uk/public_docs/News_REports/News%20Report%20No2_UNEW.pdf (4 pages).
S. Reed, A. Cormack, K. Hamilton, I. Tena Ruiz, and D. Lane, "*Automatic Ship Hull Inspection Using Unmanned Underwater Vehicles*", Proceedings from the 7$^{th}$ International Symposium on Technology and the Mine Problem, Moterey, USA, May 2006 (10 Pages).
Vaganay, J., Elkins, M., Esposito, D., Oapos, Halloran, W., Hover, F., Kokko, M., *Ship Hull Inspection with the HAUV: US Navy and NATO Demonstrations Results*, Oceans 2006, vol. Issue, 18-21, Sep. 2006, pp. 1-6.
U.S. Appl. No. 12/587,949, filed Oct. 14, 2009; Howard R. Kornstein; notice of allowance dated 09/2182012.
U.S. Appl. No. 12/800,486, filed May 17, 2010; James H. Rooney III; notice of allowance dated Sep. 27, 2012.
U.S. Appl. No. 12/800,174, filed May 10, 2010; James H. Rooney III; notice of allowance dated Aug. 17, 2012.
U.S. Appl. No. 12/313,643, filed Nov. 21, 2008; James H. Rooney III; office action dated Sep. 17, 2012.
PCT Application PCT/US2013/059548; filed Sep. 12, 2013; Raytheon Company; International Search Report mailed Jun. 30, 2014.
Paik et al.; Condition Assessment of Aged Ships; Proceedings of the 16$^{th}$ International Ship and Offshore Structures Congress; Dec. 31, 2006; pp. 265-315; vol. 2; The 16$^{th}$ International Ship and Offshore Structures Congress, Southampton, UK.
PCT Application PCT/US2013/059550; filed Sep. 12, 2013; Raytheon Company; International Search Report mailed Jun. 3, 2014.
U.S. Appl. No. 12/313,643, filed Nov. 21, 2008; James H. Rooney III; office action dated Feb. 26, 2014.
U.S. Appl. No. 12/583,346, filed Aug. 19, 2009; James H. Rooney III; office action dated Sep. 25, 2012.
U.S. Appl. No. 12/586,248, filed Sep. 18, 2009; James H. Rooney III; notice of allowance dated Oct. 24, 2012.
U.S. Appl. No. 12/313,643, filed Nov. 21, 2008; James H. Rooney.
U.S. Appl. No. 13/794,594, filed Mar. 11, 2013; Howard R. Kornstein; office action dated May 1, 2014.
PCT Application PCT/US2013/059546; filing date Sep. 12, 2013; Raytheon Company; International Search Report dated Jan. 20, 2014.

(56) References Cited

OTHER PUBLICATIONS

PCT Application PCT/US2013/059552; filing date Sep. 12, 2013; Raytheon Company; International Search Report dated Dec. 20, 2013.
PCT Application PCT/US2013/059548; filing date Sep. 12, 2013; Raytheon Company; International Search Report dated Apr. 16, 2014.
PCT Application PCT/US2013/059527; filing date Sep. 12, 2013; Raytheon Company; International Search Report dated Mar. 3, 2014.
PCT Application PCT/US2013/059551; filing date Sep. 12, 2013; Raytheon Company; International Search Report Mar. 10, 2014.
PCT Application PCT/US2013/059527; filing date Sep. 12, 2013; Raytheon Company; International Search Report mailed May 13, 2014.
EP Application EP09827853; filed Aug. 11, 2011; Raytheon Company; Supplemental European Search Report Apr. 23, 2014.
PCT Application PCTUS2013/059552: filing date Sep. 12, 2013; Raytheon Company; International Search Report Feb. 21, 2014.
Hover et al.; A Vehicle System for Autonomous Relative Survey of In-Water Ships; Marine Technology Society Journal; Jul. 2007; pp. 44-55; vol. 41, No. 2; Marine Technology Society, Washington, D.C.
Menegaldo et al.; Development and Navigation of a Mobile Robot for Floating Production Storage and Offloading Ship Hull Inspection ; IEEE Transactions on Industrial Electronics; Sep. 2009; pp. 3717-3722; vol. 56, No. 9; IEEE Service Center, Piscataway, New Jersey.
Vaganay et al.; Hovering Autonomous Underwater Vehicle-System Design Improvements and Performance Evaluation Results; 30th International Symposium on Unmanned Untethered Submarine Technology; Jul. 9, 2009; pp. 1-14.
EP Application 11783852.4; filing date May 5, 2011; Raytheon Company; European Search Report; dated Aug. 18, 2014.
U.S. Appl. No. 13/769,339, filed Feb. 17, 2013; Fraser M. Smith; Notice of Allowance mailed Jan. 30, 2015.
U.S. Appl. No. 13/769,337, filed Feb. 17, 2013; Fraser M. Smith; Notice of Allowance mailed Feb. 10, 2015.
U.S. Appl. No. 13/769,345, filed Feb. 17, 2013; Fraser M. Smith; Notice of Allowance mailed Jan. 12, 2015.
U.S. Appl. No. 13/794,594, filed Mar. 11, 2013; Howard R. Kornstein; office action dated Mar. 4, 2015.
U.S. Appl. No. 13/769,344, filed Feb. 17, 2013; Fraser M. Smith; office action dated Mar. 10, 2015.
U.S. Appl. No. 13/769,342, filed Feb. 17, 2013; Fraser M. Smith; office action dated Mar. 10, 2015.
U.S. Appl. No. 12/313,643, filed Nov. 21, 2008; James H. Rooney III; office action dated Aug. 25, 2014.
U.S. Appl. No. 13/769,337, filed Feb. 17, 2013; Fraser M. Smith; office action dated Sep. 3, 2014.
U.S. Appl. No. 13/769,339, filed Feb. 17, 2013; Fraser M. Smith; office action dated Sep. 3, 2014.
U.S. Appl. No. 13/769,342, filed Feb. 17, 2013; Fraser M. Smith; office action dated Sep. 10, 2014.
U.S. Appl. No. 13/769,345, filed Feb. 17, 2013; Fraser M. Smith; office action dated Sep. 16, 2014.
U.S. Appl. No. 13/794,594, filed Mar. 11, 2013; Howard R. Kornstein; office action dated Oct. 15, 2014.
U.S. Appl. No. 13/769,344, filed Feb. 17, 2013; Fraser M. Smith; office action dated Oct. 28, 2014.
European Search Report for application 10823726.4 dated Jun. 23rd, 2015, 104 pages.
European Search Report for application EP10817533 dated Jul. 3rd, 2015, 124 pages.
Notice of Allowance for U.S. Appl. No. 13/794,594, mailing date Aug. 27, 2015, 18 pages.
Notice of Allowance received for U.S. Appl. No. 13/769,344 dated Jul. 8th, 2015, 20 pages.
Office Action for U.S. Appl. No. 13/769,342 dated Jul. 14th, 2015, 26 pages.
Office Action for U.S. Appl. No. 13/769,346 dated Aug. 11, 2015, 33 pages.
U.S. Appl. No. 12/313,643, filed Nov. 21, 2008; James H. Rooney III; office action dated Apr. 8, 2015.
Office Action for application 13/769,342 dated Jul. 14th, 2015, 26 pages.

\* cited by examiner

HULL ROBOT WITH ROTATABLE TURRET

RELATED APPLICATIONS

This application is a continuation-in-part application of U.S. patent application Ser. No. 12/313,643, filed on Nov. 21, 2008 under 35 U.S.C. §§119, 120, 363, 365, and 37 C.F.R. §1.55 and §1.78.

FIELD OF THE INVENTION

The subject invention relates to a hull robot typically configured to clean and/or inspect the hull of a vessel.

BACKGROUND OF THE INVENTION

Co-pending U.S. patent application Ser. No. 12/313,643 filed Nov. 21, 2008 discloses a new autonomous hull robot including turbines drivable by water flowing past the hull while the vessel is underway. The turbines operate (e.g., power) the cleaning and the drive subsystems of the robot.

The flow of water past the hull of a vessel may vary in direction over the length of the hull. In addition, there may be times when the hull robot must maneuver around obstacles on the hull. It may also be desirable to traverse the hull at different angles for optimal cleaning and/or inspection operations.

BRIEF SUMMARY OF THE INVENTION

Accordingly, there may be several instances where the turbine intakes of the hull robot are not directly aligned with the flow direction of water past the hull. In such cases, the turbines may not be operating at their maximum capacity.

In one preferred embodiment, a new hull robot is designed to keep the turbine inputs aligned with the flow direction of water flowing past the hull of the vessel. In one aspect, the turbine output is maximized. The subject invention results, in part, from the realization, in one embodiment, that if the drive track of the robot is mounted on a rotatable turret, the robot turbines can be continually oriented into the water flow irrespective of the direction of travel of the robot for more efficient operation.

The subject invention features, in one example, a hull robot comprising a turbine subsystem actuatable by fluid moving past the hull, a drive subsystem for maneuvering the robot about the hull, and an adjustment subsystem for either the turbine subsystem or the drive subsystem. A controller is configured to operate the adjustment subsystem to adjust the position of the turbine subsystem relative to the drive subsystem until fluid flowing past the hull results in an optimal flow of fluid with respect to the turbine subsystem.

In one version, the adjustment subsystem includes a rotatable turret and the drive subsystem is mounted on the turret. The adjustment subsystem may further include a motor for rotating the turret. The motor is typically controlled by the controller. In one specific embodiment, the turret includes a peripheral gear and the motor is connected to worm gear driving the peripheral gear.

A sensor subsystem may be configured to monitor the output of the turbine subsystem. Typically, the controller is responsive to the sensor subsystem and is configured to control the adjustment subsystem in response to the monitored output of the sensor subsystem. In one design, the sensor subsystem includes means for monitoring the output of the turbine subsystem. In one preferred embodiment, the turbine subsystem includes two spaced turbines each driving a generator and the means for monitoring the output of the turbine subsystem includes sensors monitoring the voltage output of each generator and a comparator responsive to the sensors.

Further included may be a rotatable vane and a sensor responsive to movement of the vane. The controller is also responsive to the sensor.

In one example, the hull robot drive subsystem includes an endless magnetic belt about spaced rollers. The hull robot may further include at least one cleaning apparatus such as at least one cleaning brush. In some designs, a generator is drivable by the turbine subsystem. Further included are a motor for the drive subsystem and a power source for the motor chargeable by the generator. There may be at least one cleaning apparatus and a power source for the motor chargeable by the generator.

One hull cleaning robot in accordance with the subject invention includes a robot body, at least one cleaning brush rotatable with respect to the robot body, at least one turbine attached to the robot body for operating the at least one cleaning brush, a turret rotatable with respect to the robot body, and a drive track mounted to the turret for maneuvering the robot about the hull. An actuator adjusts the position of the turret relative to the robot body. A sensor subsystem measures an output of the turbine and a controller, responsive to the sensor subsystem, is configured to control the actuator until the output of the turbine is optimized.

The sensor subsystem may be configured to measure the revolutions per minute of the turbine. If the turbine drives a generator, the sensor subsystem may be configured to measure the output (e.g., voltage) of the generator. One actuator includes a peripheral gear on the turret and a motor driving a worm gear meshed with the peripheral gear. The motor may be powered by a battery charged by the generator. In one example, there are two spaced turbines each driving a generator and the sensor subsystem includes sensors monitoring the voltage output of each generator and a comparator responsive to the sensors.

In one example, a hull robot includes a drive subsystem for maneuvering the robot about the hull, and a turbine subsystem responsive to fluid flowing past the hull and operating the drive subsystem. The drive subsystem and the turbine subsystem are moveable with respect to each other to maintain the turbine subsystem aligned with the fluid flowing past the hull. In one version, the drive subsystem, e.g., an endless magnetic belt, is associated with (e.g., attached to) a moveable turret.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

Figure 5:
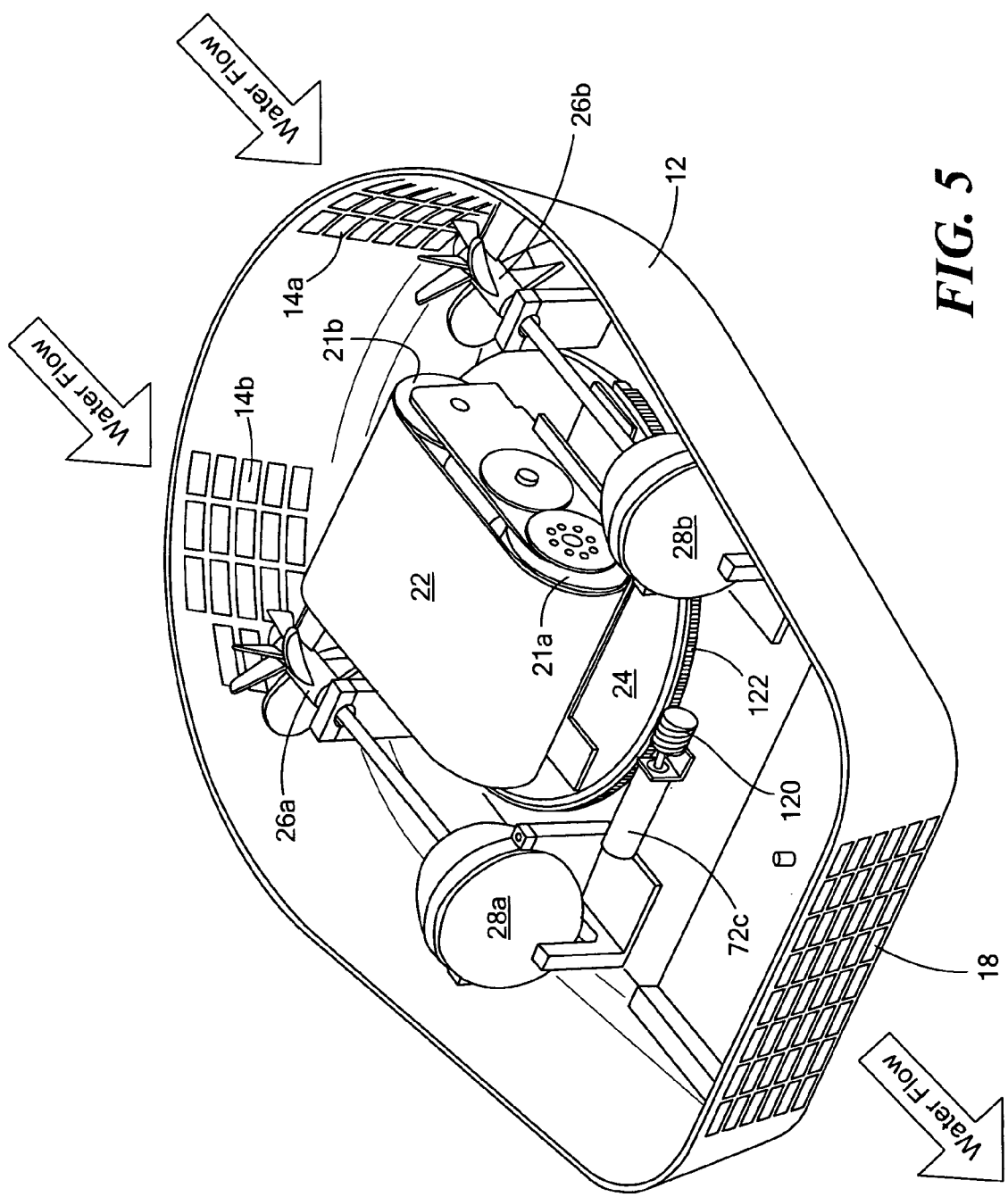
Figure 6:
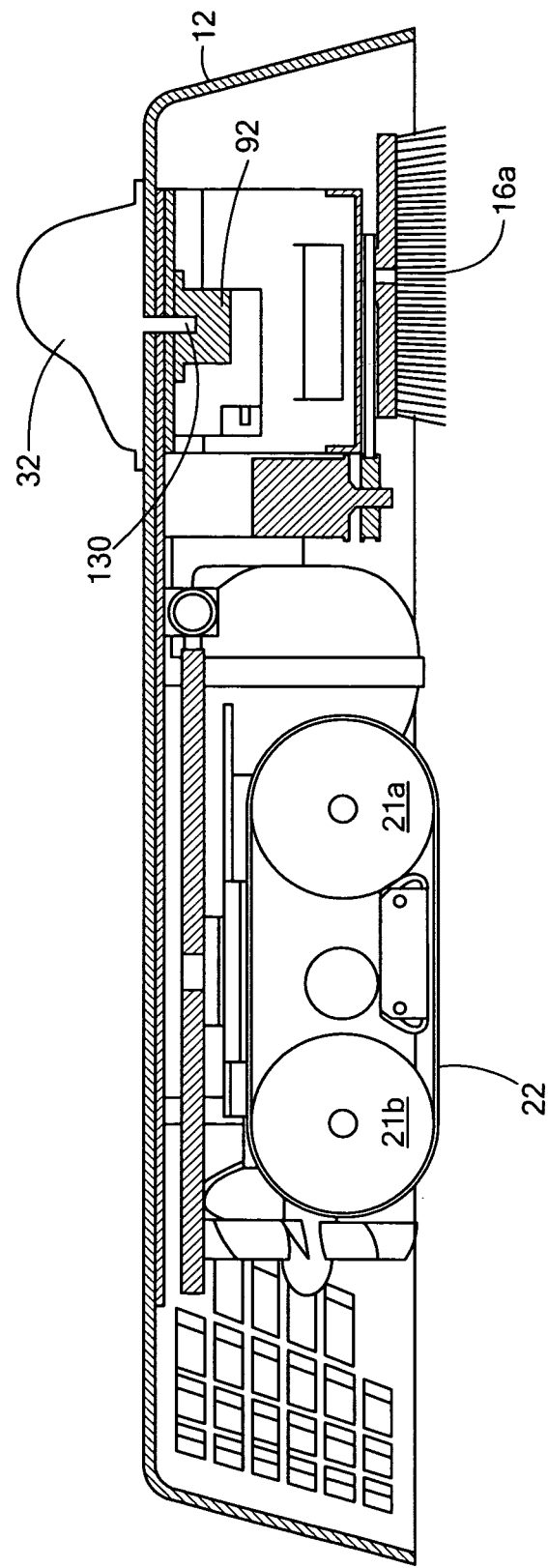
Figure 7:
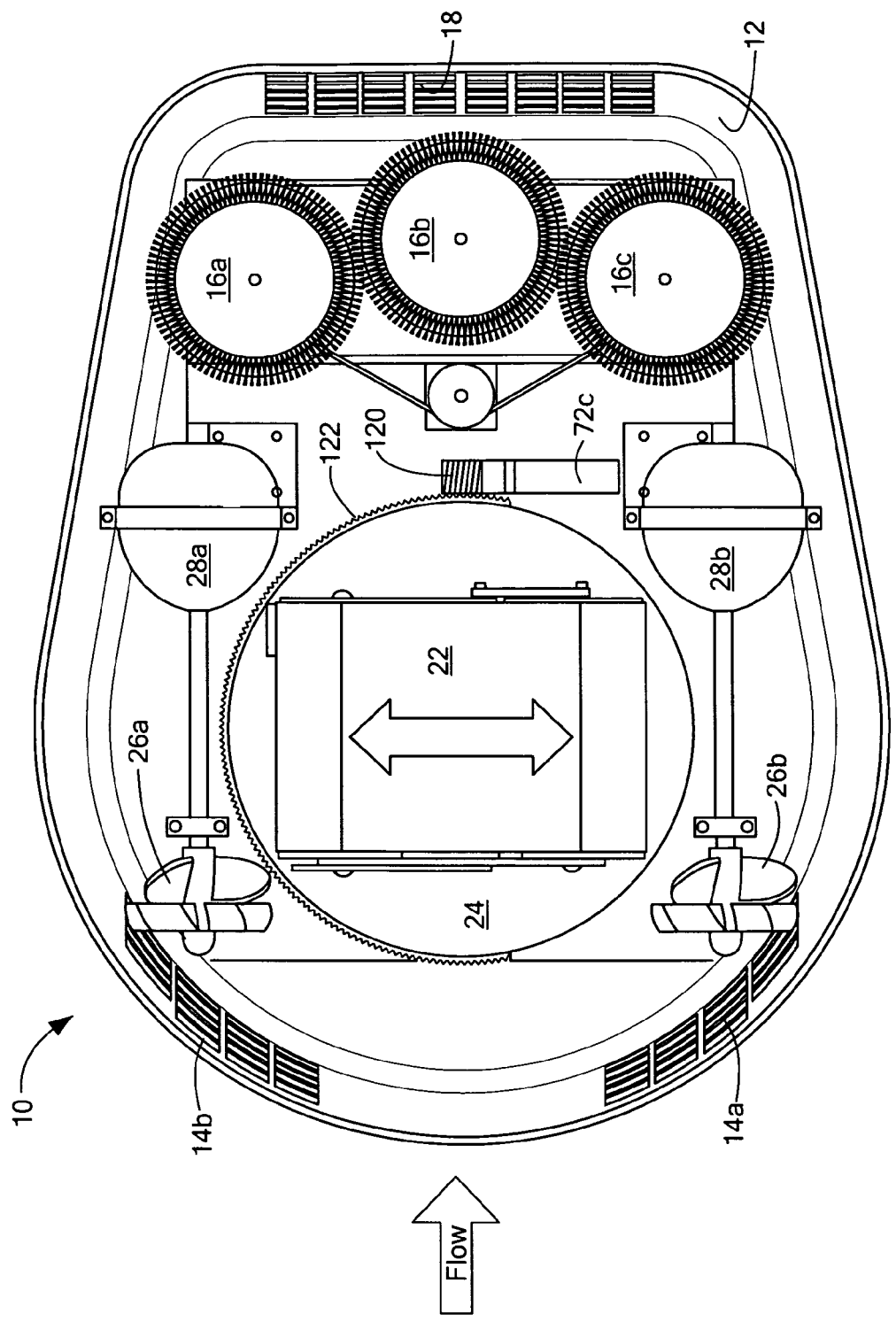
Figure 8:
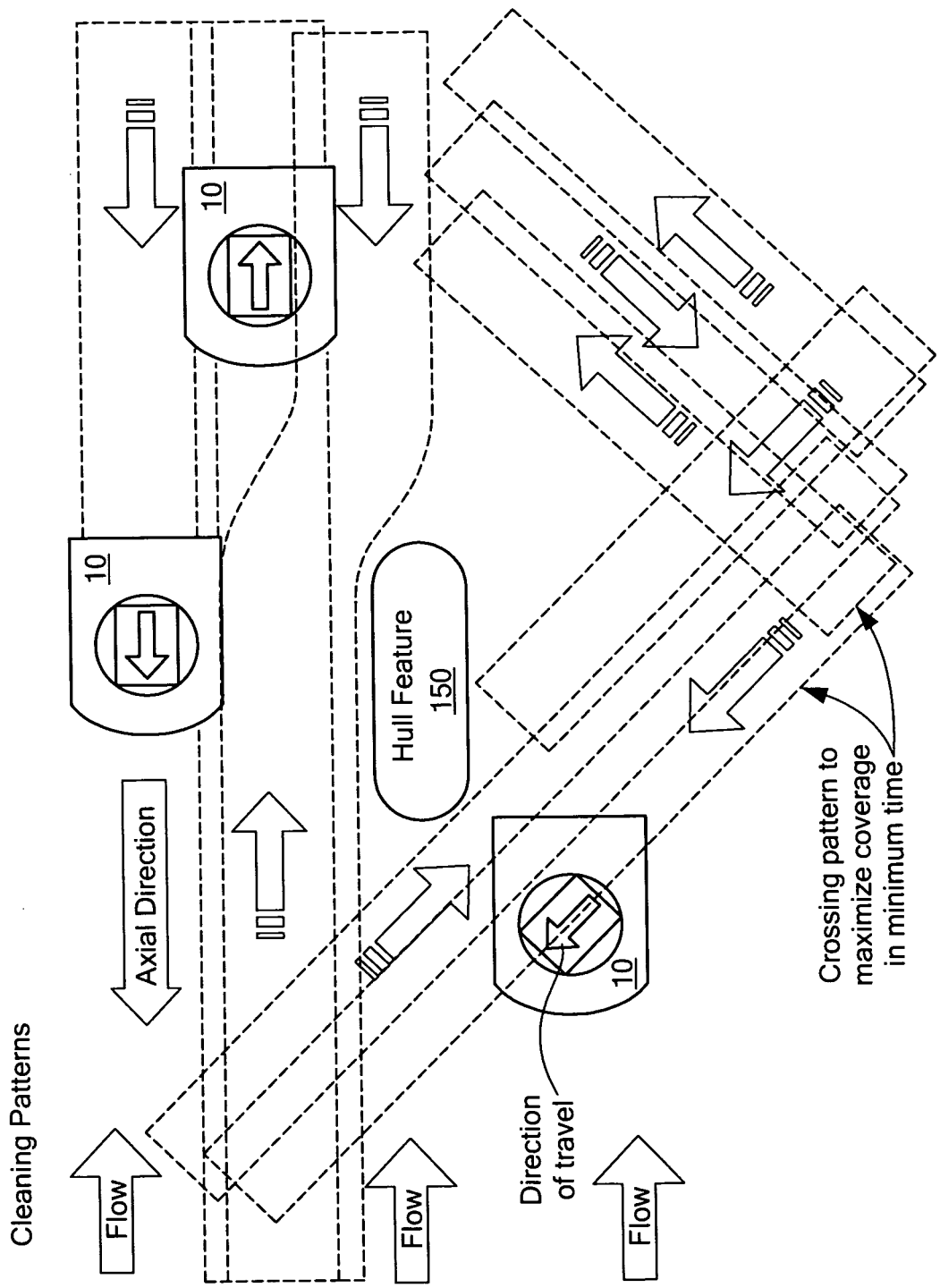
Figure 9:
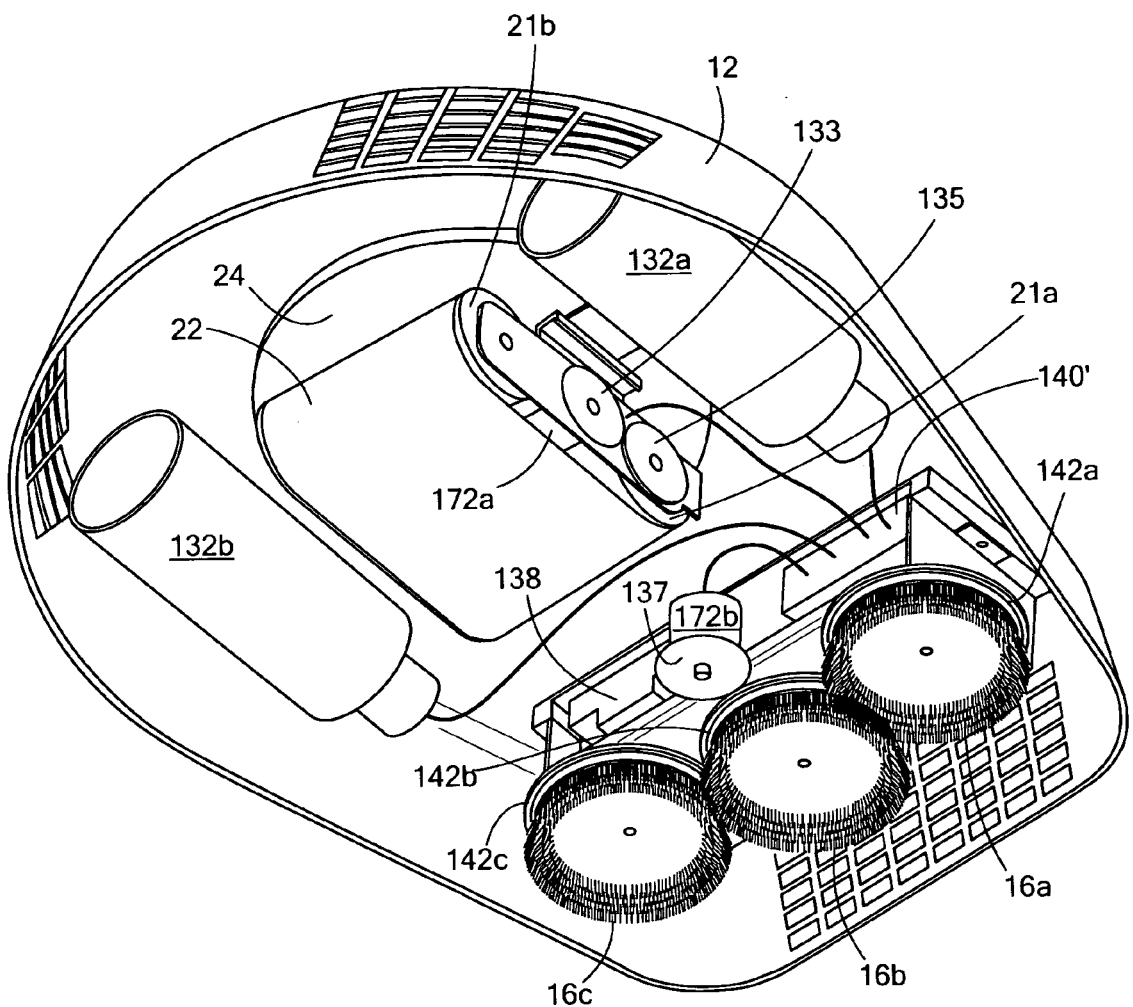
Figure 10:
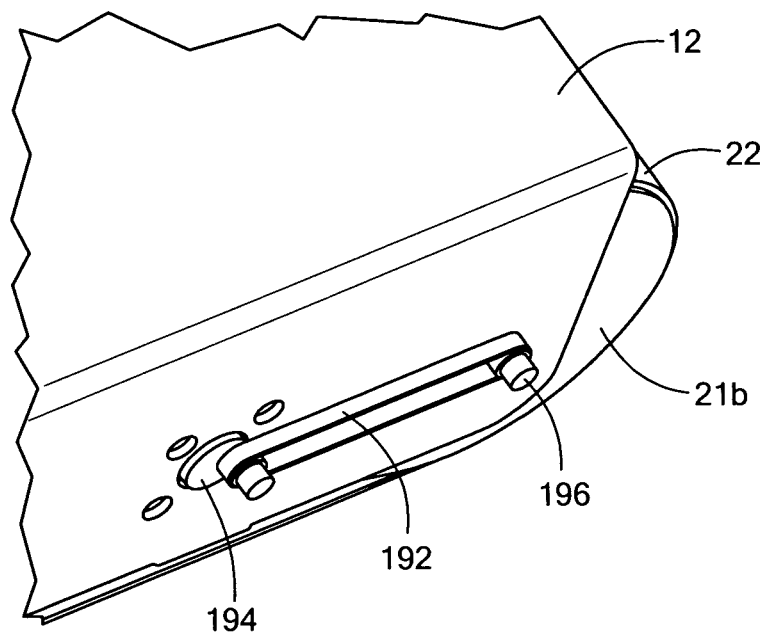
Figure 11:
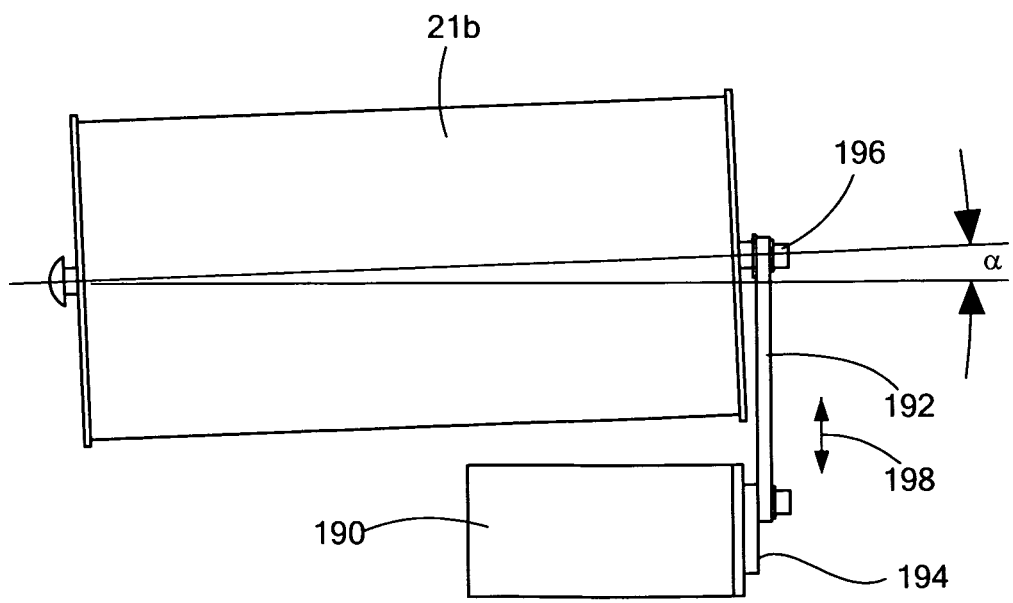
Figure 12:
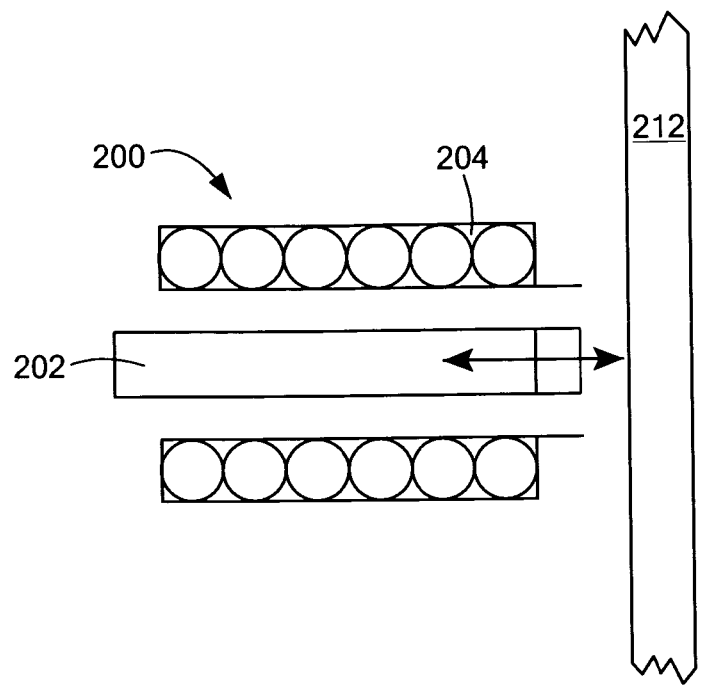
Figure 13:
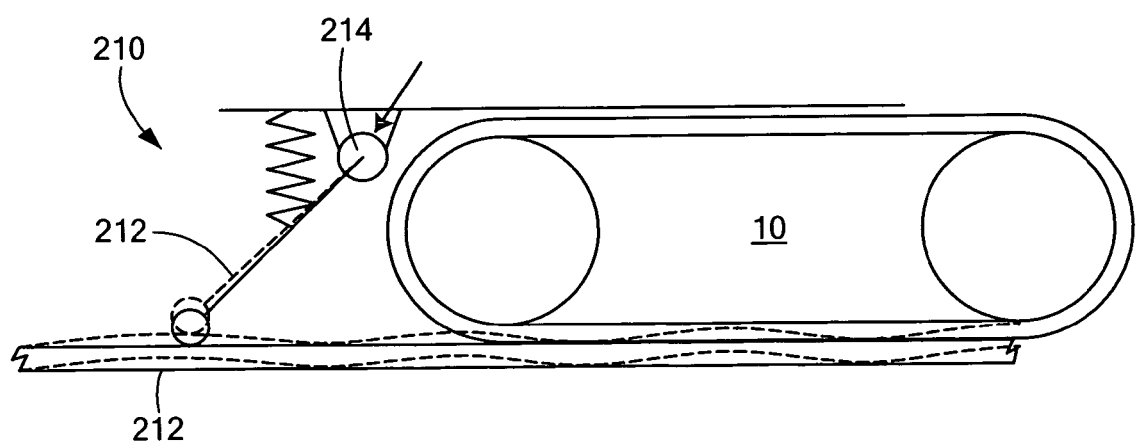
Figure 14:
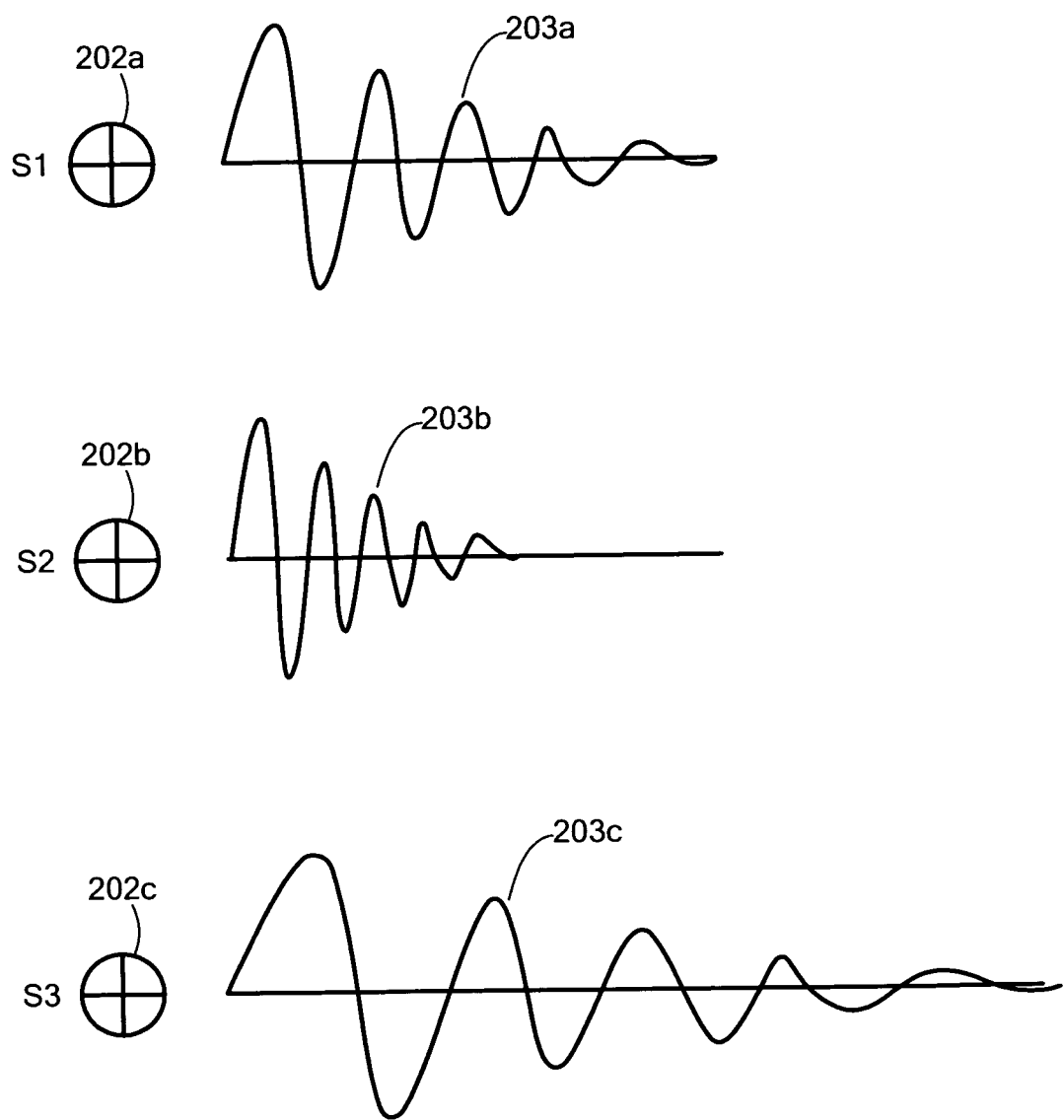
Figure 15A:
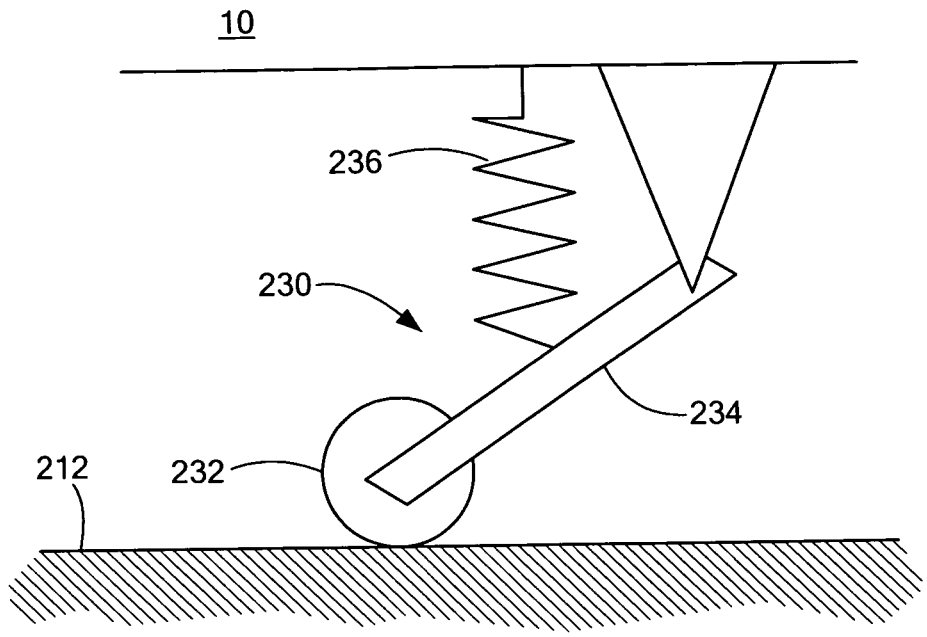
Figure 15B:
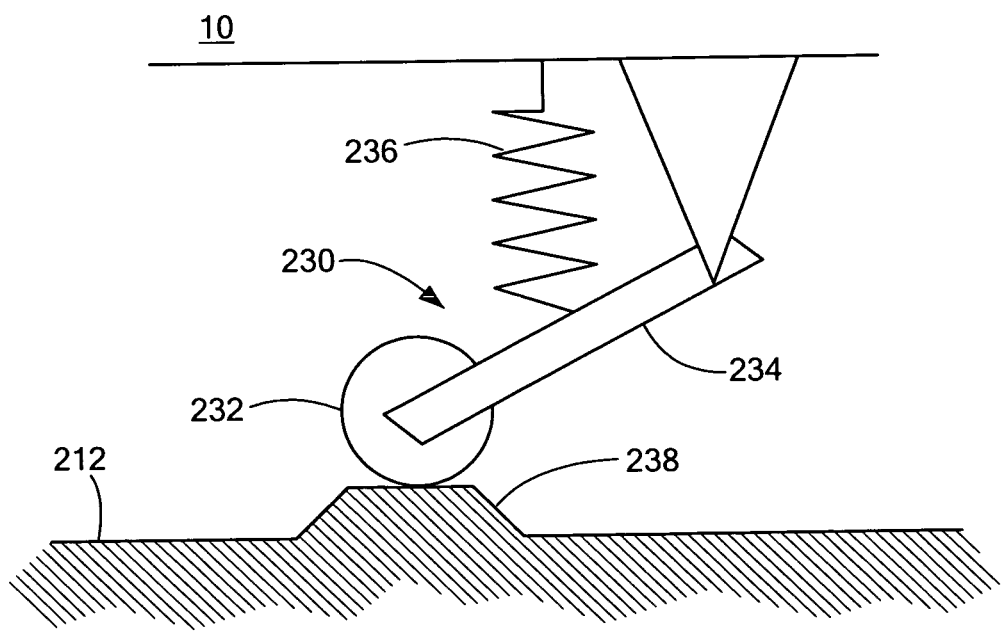

3 for maintaining the robot turbine inputs aligned with the flow direction of water flowing past the hull of a vessel;

FIG. 5 is a schematic three-dimensional bottom view of a hull robot in accordance with the subject invention showing an example where the robot drive subsystem is mounted to a rotatable turret;

FIG. 6 is a schematic cross-sectional side view of the robot shown in FIG. 5;

FIG. 7 is a schematic three-dimensional bottom view of the robot shown in FIG. 5 with the drive subsystem oriented 90° with respect to the robot body;

FIG. 8 is a highly schematic view showing different cleaning patterns which can be achieved in accordance with the subjected invention;

FIG. 9 is a schematic bottom view of a hull cleaning robot in accordance with the subject invention;

FIG. 10 is a schematic partial view of an example of a robot steering mechanism in accordance with the subject invention;

FIG. 11 is another highly schematic view showing in more detail the steering mechanism shown in FIG. 10;

FIG. 12 is a highly schematic view of a tone source which can be used for communication and navigation in accordance with the subject invention;

FIG. 13 is a highly schematic side view showing an example of a tone receiver used in connection with a hull robot in accordance with the subject invention for both communication and navigation;

FIG. 14 is a schematic view showing several different acoustic signals illustrating an example of an acoustic position system for use in the subject invention; and FIG. 15A-15B are highly schematic side views of a navigation probe useful in another embodiment of the subject invention.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
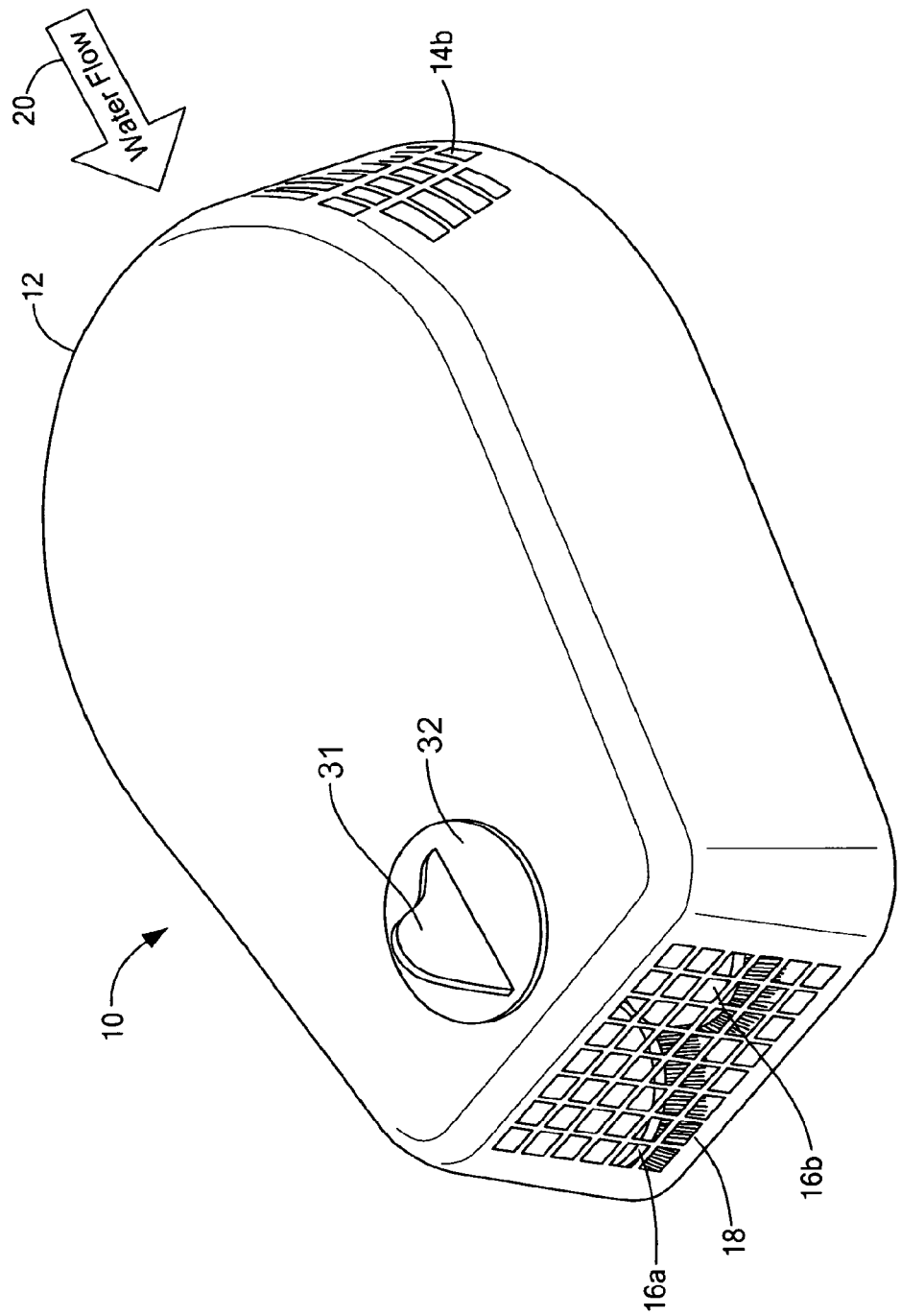
FIG. 1 is a schematic three-dimensional rear view of an example of a hull robot in accordance with the subject invention.
Figure 2:
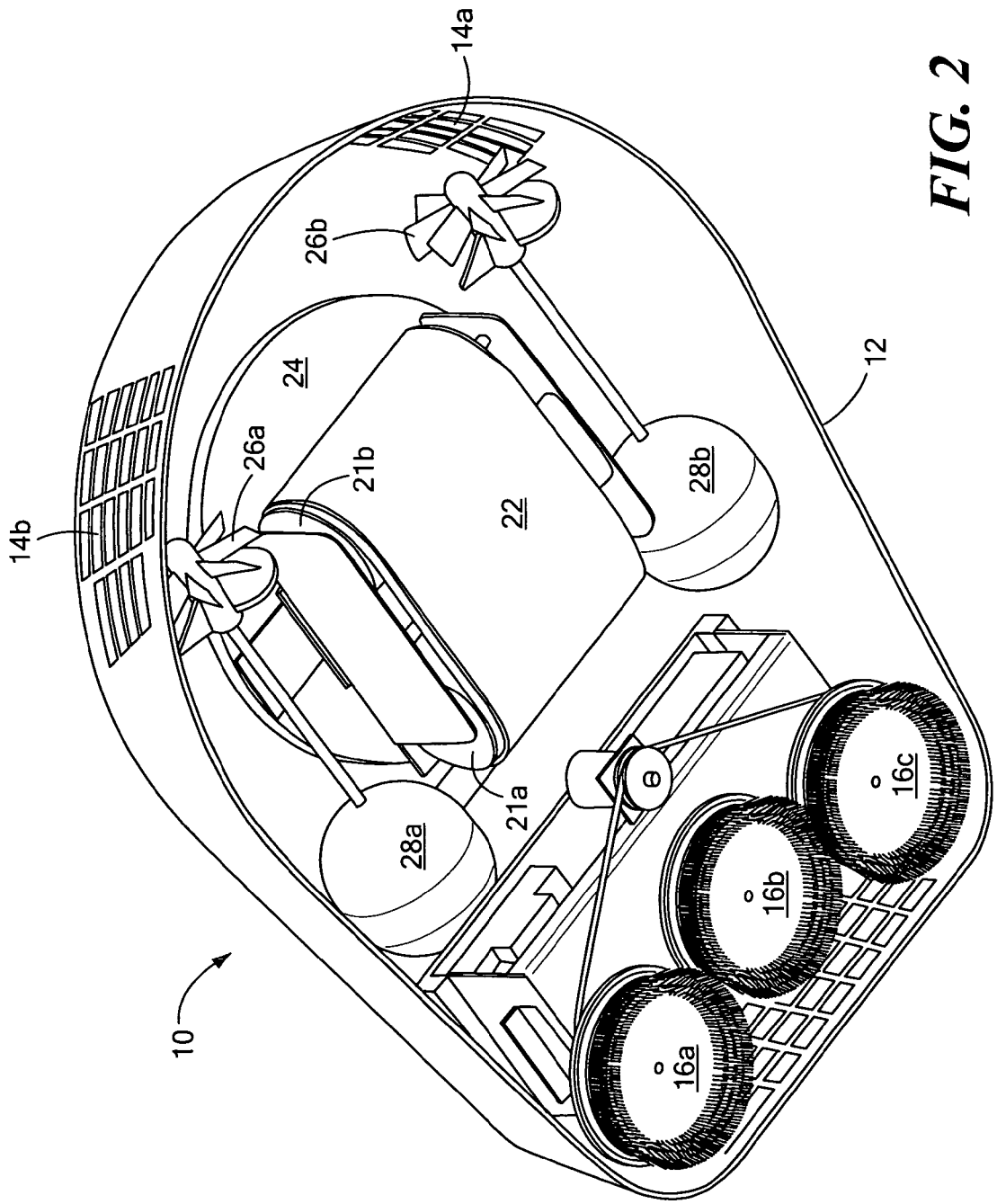
FIG. 2 is a schematic three-dimensional bottom view of the robot shown in FIG. 1.

FIGS. 1-2 show robot 10 including robot body 12 with turbine intake vents 14a and 14b and cleaning brushes 16a, 16b, and 16c behind outflow vent 18. One aspect of the subject invention includes means for maintaining the orientation of the intake vents 14a and 14b in alignment with the direction of water flowing past the hull as shown at 20 in FIG. 1 irrespective of the orientation of magnetic the robot drive subsystem, for example, drive belt 22, FIG. 2. A magnetic drive belt is typically disposed about rollers 21a and 21b as shown.

Thus, in one example, drive belt 22 is mounted on turret 24 rotatable with respect to body 12. In the example shown, turbines 26a and 26b drive generators 28a and 28b, respectively, each including an rpm sensor or voltage sensor. By monitoring the output of each generator, any difference between the outputs of turbines 26a and 26b can be detected and minimized by turning turret 24. Also, turret 24 can be turned until the outputs of turbines 26a and 26b are both maximized. This adjustment subsystem, however, is not limited to the embodiment shown where the drive track is mounted to turret 24. In still other examples, a sensor or the like can be used to determine the direction of fluid flow with respect to the robot body.

FIG. 1 also shows water vane 32 rotatable with respect to robot body 12. Vane 32 is configured with a center of pressure 31 which keeps vane 32 aligned with the direction of water flowing past the hull. Sensing the position of vane 32 relative to turbine intakes 14a and 14b enables vane 32 to be used as a sensor for adjusting the position of turret 24, FIG. 2.

Figure 3:
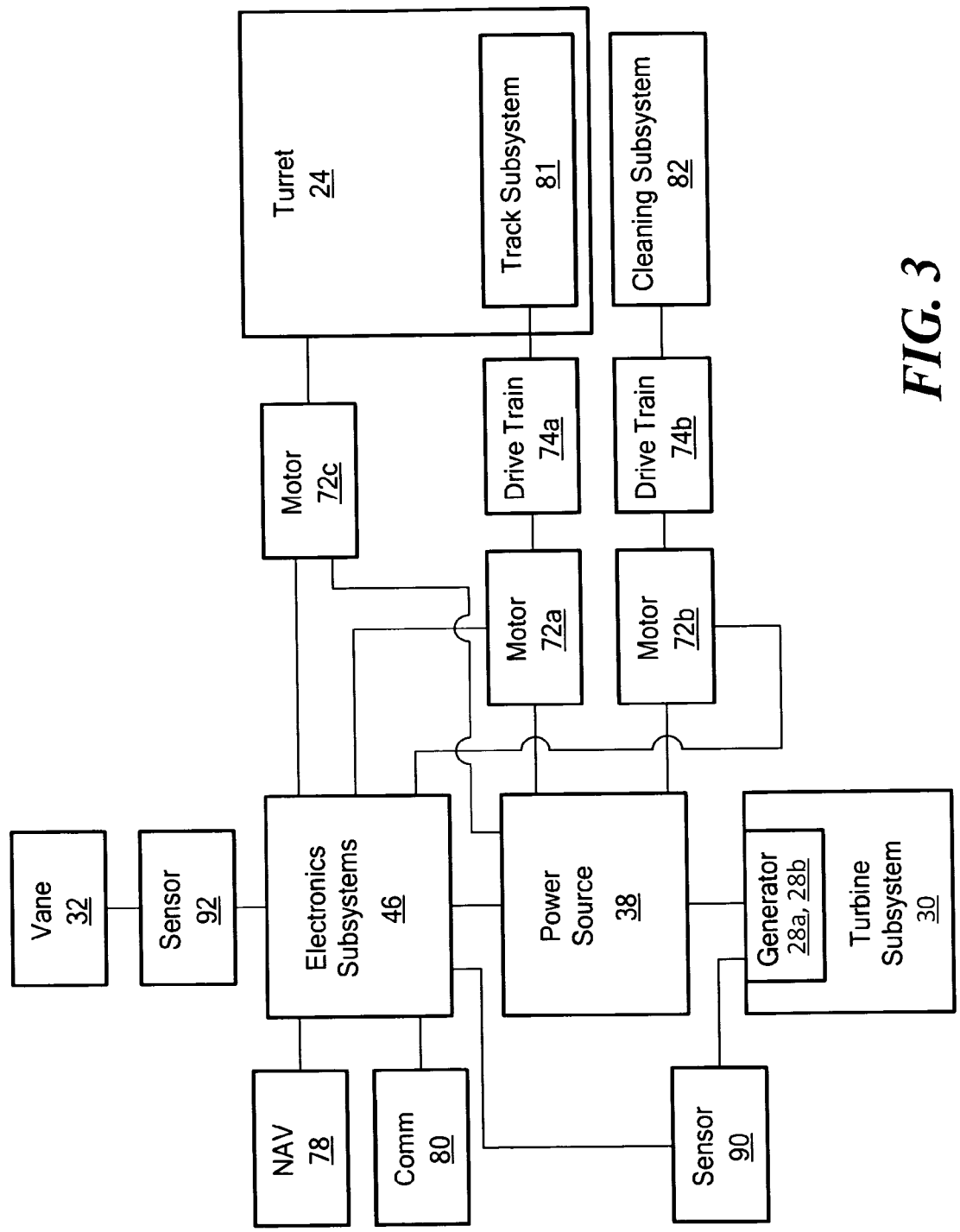
FIG. 3 is a block diagram showing the primary components associated with a hull robot in accordance with the subject invention.

FIG. 3 illustrates an embodiment of the subject invention where turbine subsystem 30 (including one or more devices actuatable by fluid flowing past the hull) includes generator 28a, 28b which recharges power source 38. One or more motors, such as motor 72a and motor 72b, are powered by power source 38. Motor 72a drives track subsystem 81 via drive train 74a. The direction of travel of the robot can be reversed via electronic control subsystem 46 which is configured to reverse the direction of motor 72a based on inputs, for example, from navigation subsystem 78 and/or communication subsystem 80. Electronic controller 46 is also powered by power source 38. Similarly, motor 72b drives cleaning subsystem 82 (e.g., one or more brushes) via drive train 74b. Motor 72b is also energized by power source 38. In other embodiments, the one or more motors may operate on the basis of a power source other than electricity. Motors are known, for example, that are fluid driven. The turbine subsystem, then, may pump fluid under pressure to the motors. If the cleaning subsystem is passive, e.g., a pad and/or a squeegee, motor 72b and drive train 74b would not be required. Electronic subsystem 46 typically includes one or more microprocessors, power circuits, and the like. Steering of the robot, navigation, and communication subsystems which may be associated with the robot are disclosed in U.S. patent application Ser. No. 12/313,643. Additional details concerning the cleaning brushes, the track subsystem, are also described in this reference.

FIG. 3 also shows motor 72c driving turret 24. Motor 72c is powered by power source 38 and is controlled by electronic subsystem or controller 46 which receives the output of sensor subsystem 90 responsive to generator 28a, 28b and (optionally) the output of vane 32 sensor 92.

Figure 4:
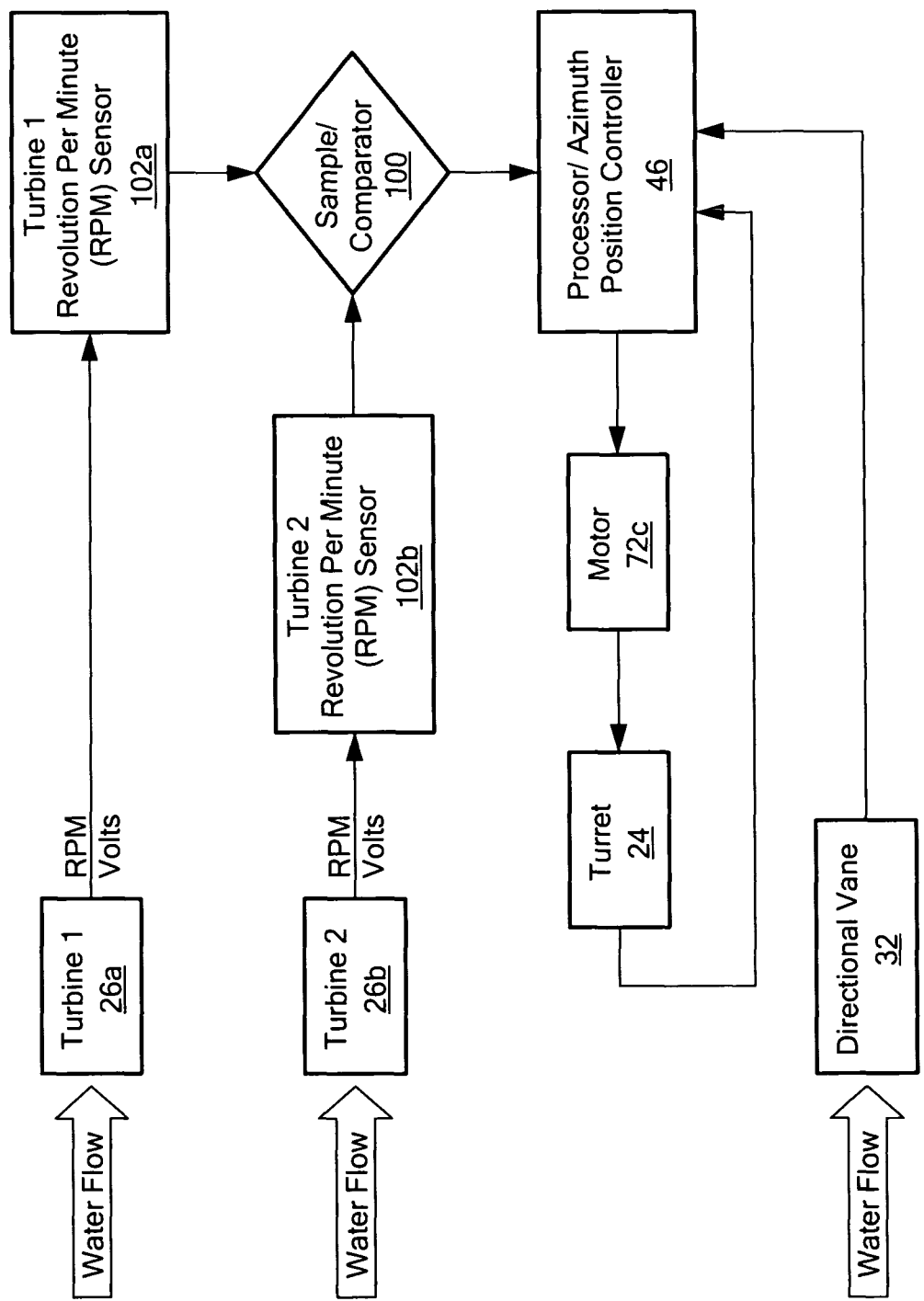
FIG. 4 is a flow chart depicting the primary operations carried out by the electronic subsystem or controller of FIG.

Controller 46, FIG. 4 determines any difference between the output of turbines 26a and 26b via comparator 100 to control motor 72c for turret 24 accordingly. The output of turbines 26a and 26b evaluated by the sensor subsystem may be RPM sensors 102a and 102b and/or the voltage output of any generators associated with the turbines as discussed above. If the generators are not used, the output of the turbines can be monitored in other ways. The output of vane subsystem 32 is also monitored by controller 46 as shown in order to controller motor 72c. In the case, where the output of the turbines is very low (if, for example, the turbine intakes are oriented 90° with respect to the water flow direction) the output of directional vanes 32 may be the primary output to controller 46 used to control turret 24 motor 72c. The output of directional vane 32 may also be used to determine the operational direction of turret motor 72c. In other examples, there is only one turbine and controller 46 controllers motor 72c to rotate the turret 24 until the output of the turbine is at a maximum.

FIG. 5 shows motor 72c driving worm gear 120 engaged with peripheral gear 122 on turret 24. Turret 24 rotates with respect to hull 12 via a shaft or the like. Other actuator systems for adjusting the position of turret 24 are possible. Typically, other subsystems are included as components of the robot, for example, a cleaning subsystem, a navigation subsystem, a communication subsystem, and the like. Preferably robot body 12 need not be tethered to any kind of an on-board power or control subsystem. A turbine subsystem can operate the drive subsystem (and, in one example, a cleaning subsystem) directly or via a generator charging a power subsystem (e.g., a battery pack) which supplies power to one or more motors driving the drive subsystem and/or the cleaning subsystem. The battery pack can also be used to energize the other electronic and/or electromechanical subsystems associated with the robot. It is also possible for a generator to drive one or more motors directly.

FIG. 6 shows an example of where vane 32 rotates with respect to body 12 via post 130 coupled to potentiometer sensor 92. The output of potentiometer 92 is proportional to the misalignment of the robot body 12 with respect to the water flow direction along the hull.

FIG. 7 shows a situation where the direction of travel of robot 10 is orthogonal to the direction of the water flow through turbine inlets 14a and 14b and yet the inlets are aligned with the direction of water flow to maximize the power output of generators 28a and 28b since turret 24 has been rotated accordingly.

In this way, robot 10, FIG. 8 can maneuver around hull feature 150 and also diagonally across the hull as shown and in all cases the turbines can be oriented into the flow direction to keep the battery pack adequately charged for autonomous operation of the robot over long periods of time.

Drive subsystems other than a magnetic track are within the scope of the subject invention as are other means for moving the drive and turbine subsystems relative to each other to maintain the turbine subsystem aligned with the fluid flowing past the hull.

FIG. 9 shows a version of robot body 12 housing turbine/generator units 132a and 132b which, when deployed, charge battery 138 via controlling electronics 140. Battery 138 provides power (via controlling electronics 140) to drive motor 172a which turns gear 133 driving gear 135 of drive belt roller 21a. Battery 138 also provides power (via controlling electronics 140) to brush motor 172b which turns gear 137 cooperating with gear 142b itself driving cleaning brush gears 142a and 142c. Controlling electronics 140 (typically employing a microprocessor, power circuits, and the like), is also powered by battery 138.

FIGS. 10-11 show an example of a steering subsystem including motor 190 (powered by a battery pack) and actuator 194 rotated by motor 190. Roller 21b is angled with respect to the robot chassis in this particular example via linkage 192 between actuator 194 and roller shaft 196 to angle shaft 196 (see angle α in FIG. 11). Actuator 194 rotates to drive linkage 192 to and fro in the directions shown by arrow 198. As a result, roller 21b is angled to steer the robot. Other steering subsystems are possible. See, for example, U.S. Pat. Nos. 3,934,664; 4,046,429; and 4,119,356 incorporated herein by this reference. If two drive tracks are used, steering can be effected via differentially operating the tracks.

A variety of communication and navigation subsystems are possible. In one particular example, transducer 200, FIG. 12 includes striker 202 driven by solenoid 204 to strike the hull structure 212. The resulting acoustic signature can be detected by the robot 10 on the exterior side of the hull. A simple message can, for example, instruct the robot to reverse direction or to maneuver to a prescribed pick up location above the water line. Alternatively, or in addition, the robot can be equipped with such a transducer to effect, for example, two-way communications through the vessel hull.

FIG. 13 shows robot 10 equipped with receiver 210 in the form of pick up head 212 and position sensor 214 (e.g., a potentiometer/encoder) responsive thereto for detecting vibrations in hull 212 due to striker 202, FIG. 12. Using acoustic through-the-hull communications, the robot can be instructed by an on-board computer. One tone, for example, may signal a reverse direction command, two tones can invoke a steer left command, may signal a reverse direction command, two tones can invoke a steer left command, and the like. By using different tone series and/or frequencies, more complex messages can be sent to (and optionally received from) the robot. Other communications systems, however, are possible.

By employing multiple strikers 202a-202c, FIG. 14, navigation is also possible. Striker 202a is driven to send out an acoustic signal at a first frequency as shown at 203a, striker 202b is driven to provide a signal through the hull at a second frequency 203b, and striker 202c is driven to provide a third acoustic signal at a frequency 203c through the hull. At the robot, the signals are detected (using the receiver 210 shown in FIG. 13, for example), filtered, and converted into a digital signal via an analog-to-digital converter. The tone signals are separated and the time delays between signals are determined by an electronic subsystem associated with the robot in order to triangulate the position of the robot on the hull. Thus, an electronic control module, for example, typically includes software and/or circuitry for communication, navigation, and robot maneuvering/control.

In another example, features of the hull are mapped and detected by the robot in order to determine the position of the robot on the hull. FIG. 15A shows probe 230 associated with the robot including roller 232, arm 234, and sensor or switch 236 responsive to arm 234. When roller 232 raises due to a construction weld or by design landmark weld 238, FIG. 15B, sensor 236 detects this event and the robot control subsystem is configured to reference a stored map of such features to establish the position of the robot on the hull. In one simple design, as the robot proceeds along the length of the hull, it simply keeps track of how many weld lines it has encountered and, after passing a preset number of weld lines, it turns slightly, reverses its direction, and proceeds backwards along the length of the hull for cleaning and/or inspection operations.

Thus, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A hull robot comprising:
 a drive subsystem for maneuvering the robot about the hull;

a turbine subsystem movable relative to the drive subsystem and actuatable by fluid moving past the hull as the hull moves through the fluid, the turbine subsystem comprising a turbine intake, wherein an orientation of the turbine intake is maintained in alignment with a direction of fluid flowing outside the hull robot and past the hull as the robot maneuvers about the hull in different directions along multiple axes;

an adjustment subsystem for either the turbine subsystem or the drive subsystem; and a controller configured to operate the adjustment subsystem to adjust the orientation of the turbine subsystem relative to the drive subsystem.

2. The hull robot of claim 1 in which the adjustment subsystem includes a rotatable turret and the drive subsystem is mounted on the turret.

3. The hull robot of claim 2 in which the adjustment subsystem further includes a motor for rotating the turret.

4. The hull robot of claim 3 in which the motor is controlled by the controller.

5. The hull robot of claim 3 in which the turret includes a peripheral gear and the motor is connected to a worm gear driving the peripheral gear.

6. The hull robot of claim 1 further including a sensor subsystem configured to monitor the output of the turbine subsystem.

7. The hull robot of claim 6 in which the controller is responsive to the sensor subsystem and is configured to control the adjustment subsystem in response to the monitored output of the sensor subsystem.

8. The hull robot of claim 6 in which the turbine subsystem includes two spaced turbines each driving a generator and the sensor subsystem includes sensors monitoring the voltage output of each generator and a comparator responsive to the sensors.

9. The hull robot of claim 7 further including a rotatable vane and a sensor responsive to movement of the vane, and wherein the controller is responsive to the sensor.

10. The hull robot of claim 1 in which the drive subsystem includes at least one endless magnetic belt about spaced rollers.

11. The hull robot of claim 1 further including at least one cleaning apparatus.

12. The hull robot of claim 11 in which the cleaning apparatus includes at least one cleaning brush.

13. The robot of claim 11 further including a generator drivable by the turbine subsystem.

14. The hull robot of claim 13 further including a motor for the drive subsystem and a power source for the motor chargeable by the generator.

15. The hull robot of claim 13 further including a motor for the at least one cleaning apparatus and a power source for the motor chargeable by the generator.

16. A hull cleaning robot comprising:
a robot body;
a turret rotatable with respect to the robot body;
a drive track mounted to the turret for maneuvering the robot about the hull;
an actuator for adjusting the position of the turret relative to the robot body;
at least one cleaning brush rotatable with respect to the robot body;
at least one turbine attached to the robot body movable relative to the drive track and actuatable by water flowing past a hull as the hull and the turbine move through the water, the at least one turbine operating the at least one cleaning brush, wherein an orientation of a turbine intake of the at least one turbine is adjustable relative to the drive track, such that an orientation of the turbine intake is maintained in alignment with a direction of fluid flowing outside the hull robot and past the hull, and such that optimal output of the turbine is maintained as the robot maneuvers about the hull in different directions along multiple axes;
a sensor subsystem for measuring an output of the at least one turbine; and
a controller responsive to the sensor subsystem configured to control the actuator to adjust the orientation of the turret.

17. The hull cleaning robot of claim 16 in which the sensor subsystem is configured to measure the revolutions per minute of the turbine.

18. The hull cleaning robot of claim 16 in which the at least one turbine includes a generator and the sensor subsystem is configured to measure the output of the generator.

19. The hull cleaning robot of claim 16 in which the actuator includes a peripheral gear on the turret and a motor driving a worm gear meshed with the peripheral gear.

20. The hull cleaning robot of claim 16 in which there are two spaced turbines each driving a generator and the sensor subsystem includes sensors monitoring the voltage output of each generator and a comparator responsive to the sensors.

21. The hull cleaning robot of claim 20 further including a rotatable vane and a sensor responsive to movement of the vane, wherein the controller is responsive to the sensor.

22. A hull robot comprising:
a drive subsystem for maneuvering the robot about the hull; and
a turbine subsystem movable relative to the drive subsystem and responsive to fluid flowing past the hull as the hull moves through the fluid, the turbine subsystem operating the drive subsystem and comprising a turbine intake,
wherein an orientation of the turbine intake is maintained in alignment with a direction of the fluid flowing outside the hull robot and past the hull as the robot maneuvers about the hull in different directions along multiple axes.

23. The hull robot of claim 22 in which the drive subsystem is associated with a moveable turret.

24. The hull robot of claim 22 further including a sensor configured to detect the direction of the flowing fluid with respect to the robot.

25. The hull robot of claim 24 in which the sensor includes a vane rotatable with respect to the robot and having a center of pressure configured to align the vane with the direction of the flowing fluid.

* * * * *